(12) United States Patent
Brenneke

(10) Patent No.: US 9,180,547 B2
(45) Date of Patent: Nov. 10, 2015

(54) ROBOTIC WELDER HAVING FUME EXTRACTION

(75) Inventor: William N. Brenneke, Oswego, IL (US)

(73) Assignee: Caterpillar Inc., Peoria, IL (US)

( * ) Notice: Subject to any disclaimer, the term of this patent is extended or adjusted under 35 U.S.C. 154(b) by 2092 days.

(21) Appl. No.: 12/216,116

(22) Filed: Jun. 30, 2008

(65) Prior Publication Data

US 2009/0321403 A1    Dec. 31, 2009

(51) Int. Cl.
*B23K 9/16*         (2006.01)
*B23K 9/32*         (2006.01)
*B23K 37/00*        (2006.01)

(52) U.S. Cl.
CPC .............. *B23K 9/321* (2013.01); *B23K 37/006* (2013.01)

(58) Field of Classification Search
CPC .... B23K 37/006; B23K 9/0956; B23K 9/167; B23K 9/186; B23K 9/321; B23K 9/324; B23K 9/325; B23K 9/16; B23K 10/02; B23K 15/0046; B23K 20/129; B23K 26/20; B23K 9/173; B23K 15/0053; B23K 26/28; B23K 9/0213; B23K 9/028; B23K 2201/001; B23Q 11/0046; F01D 5/063; F01D 5/025; F24F 7/00
USPC ..................................................... 219/137.41
See application file for complete search history.

(56) References Cited

U.S. PATENT DOCUMENTS

| | | | |
|---|---|---|---|
| 2,778,910 A * | 1/1957 | Landis et al. ............. | 219/137.31 |
| 3,305,663 A * | 2/1967 | Janssen ...................... | 219/76.1 |
| 4,057,705 A | 11/1977 | Cockrum et al. | |
| 4,095,080 A | 6/1978 | Ueyama et al. | |
| 4,276,464 A * | 6/1981 | Forney ........................... | 219/136 |
| 4,284,873 A | 8/1981 | Schlüter | |
| 4,287,405 A | 9/1981 | Ohmae et al. | |
| 4,656,329 A * | 4/1987 | Moerke .......................... | 219/136 |
| 4,860,644 A | 8/1989 | Kohl et al. | |
| 4,998,004 A * | 3/1991 | Lawrence et al. ........ | 219/121.13 |
| 5,015,821 A | 5/1991 | Sartorio et al. | |
| 5,036,754 A | 8/1991 | Simms et al. | |
| 5,085,133 A * | 2/1992 | Hickling et al. ................. | 454/63 |
| 5,410,120 A * | 4/1995 | Taylor ............................. | 219/72 |
| 5,491,320 A * | 2/1996 | Taylor ...................... | 219/137.41 |
| 5,491,321 A * | 2/1996 | Stuart et al. .............. | 219/137.61 |
| 5,811,055 A * | 9/1998 | Geiger ............................ | 266/49 |
| 5,911,893 A | 6/1999 | Kilty et al. | |
| 6,060,689 A * | 5/2000 | Wilson ...................... | 219/137.41 |
| 6,236,013 B1 * | 5/2001 | Delzenne .................. | 219/121.54 |
| 6,371,362 B1 | 4/2002 | Mehta et al. | |
| 6,761,776 B2 | 7/2004 | Bowlin et al. | |
| 6,910,614 B2 * | 6/2005 | Mitten et al. ..................... | 228/46 |
| 7,286,223 B2 | 10/2007 | Denney et al. | |
| 2006/0127067 A1 * | 6/2006 | Wintenberger et al. ...... | 392/416 |
| 2006/0226136 A1 | 10/2006 | Zamuner | |
| 2007/0056942 A1 * | 3/2007 | Daniel et al. .............. | 219/125.1 |
| 2009/0321403 A1 * | 12/2009 | Brenneke .................. | 219/137.41 |

* cited by examiner

*Primary Examiner* — Eric Stapleton

(74) *Attorney, Agent, or Firm* — Finnegan, Henderson, Farabow, Garrett & Dunner, LLP

(57) ABSTRACT

A method for extracting fumes from a robotic welder is disclosed. The method includes controlling a robotic welder to produce a weld and extracting fumes produced by the robotic welder via a vacuum source. The method also includes selectively varying the vacuum source as a function of the position of the robotic welder.

8 Claims, 1 Drawing Sheet

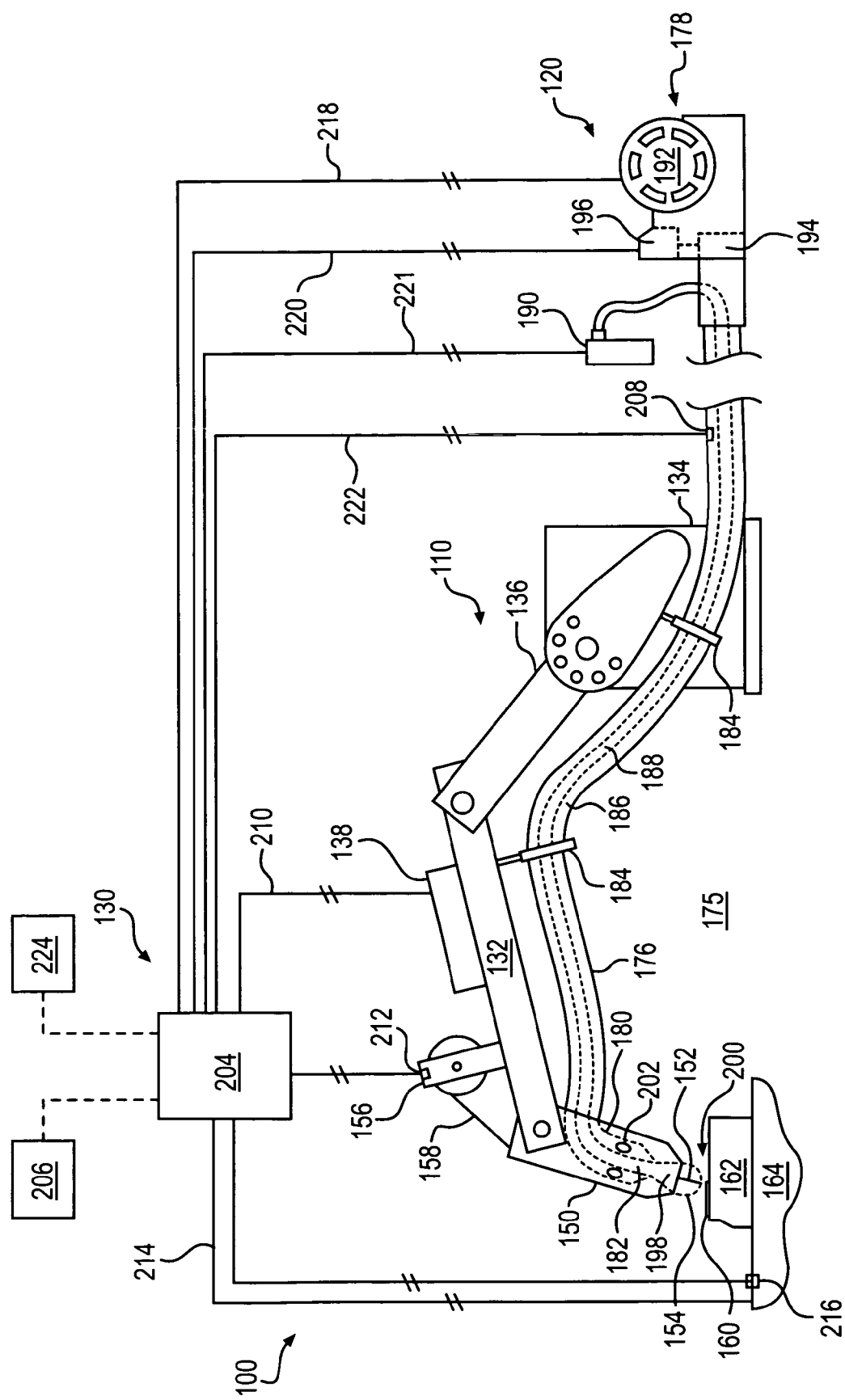

ROBOTIC WELDER HAVING FUME EXTRACTION

TECHNICAL FIELD

The present disclosure is directed to a robotic welder and, more particularly, to a robotic welder having fume extraction.

BACKGROUND

Welders such as, for example, gas shielded metal arc welders often include fume extraction equipment that develops an air flow near the welding arc to remove welding fumes. Welders also typically have a shield gas envelope for protecting the weld.

One attempt at providing fume extraction for robotic welders is described in U.S. Pat. No. 4,656,329 (the '329 patent) issued to Moerke. The '329 patent discloses a rotatable mount for a robot machine that includes a welding unit having a welding tip. The '329 patent discloses that the welding tip is housed within a gas nozzle for releasing shield gas. The '329 patent also discloses an external assembly for welding fume extraction that is connected to the welding unit. The extraction assembly draws in welding fumes via an inlet disposed on the welding unit adjacent to the welding tip.

Although the welding system of the '329 patent may provide a method for fume extraction for a robotic welder, it may fail to appropriately vary the rate of suction flow as a function of a welding procedure. Because the rate of flow may not be appropriately adjustable, the welding system may have too low of a fume extraction flow rate during certain stages of the welding procedure and thus may not extract enough welding fumes. Also, the welding system may have too high of a fume extraction flow rate during certain stages of the welding procedure and may extract the beneficial shield gases.

The present disclosure is directed to overcoming one or more of the shortcomings set forth above and/or other deficiencies in the art.

SUMMARY OF THE DISCLOSURE

In accordance with one aspect, the present disclosure is directed toward a method for extracting fumes from a robotic welder. The method includes controlling a robotic welder to produce a weld and extracting fumes produced by the robotic welder via a vacuum source. The method also includes selectively varying the vacuum source as a function of the position of the robotic welder.

According to another aspect, the present disclosure is directed toward a fume extraction system for use with a robotic welder. The fume extraction system includes a robotic welder having a weld tip and a variable vacuum source coupled in proximity to the weld tip. The fume extraction system also includes a controller configured to vary the vacuum source.

BRIEF DESCRIPTION OF THE DRAWINGS

FIG. 1 is a schematic illustration of an exemplary disclosed welding system.

DETAILED DESCRIPTION

FIG. 1 illustrates an exemplary welding system 100 that may include a robotic welder 110, a fume extraction system 120, and a control system 130. Control system 130 may control robotic welder 110 and/or fume extraction system 120. Fume extraction system 120 may remove welding fumes produced by robotic welder 110.

Robotic welder 110 may include a main arm 132 mechanically coupled at one end to a base 134 via a pivot arm 136. Pivot arm 136 may allow main arm 132 to move relative to base 134. Robotic welder 110 may also include a power source and actuation system for movement. A power block 138 for transferring electrical energy to robotic welder 110 may be disposed on main arm 132. A torch arm 150 may be mechanically connected to main arm 132 and may include a weld tip 152 for generating a welding arc 154. A wire feeder 156 may be disposed on main arm 132 and may feed weld wire 158 to torch arm 150. Weld wire 158 may be passed via a passageway within torch arm 150 to weld tip 152, where weld wire 158 may be melted by weld tip 152 to form a weld 160 on a work piece 162 supported by a support member 164.

Fume extraction system 120 may remove fumes generated during welding by robotic welder 110 from a work area 175. Fume extraction system 120 may include a passage 176 for transporting welding fumes and shield gases to and from work area 175. Fume extraction system 120 may also include a vacuum source 178 for displacing welding fumes by producing a pressure differential. Fume extraction system 120 may additionally include a fume chamber 180 and a shield gas chamber 182 for transferring welding fumes and shield gases between work area 175 and passage 176.

Passage 176 may be any suitable conduit known in the art for transporting fumes such as, for example, a helically ribbed elastomeric or plastic hose. Passage 176 may be secured to robotic welder 110 via any suitable technique known in the art such as, for example, structural clamps 184. Passage 176 may include a fume conduit 186 for transporting welding fumes and a shield gas conduit 188 for transporting shield gases. Shield gas conduit 188 may be included as a separate passage within fume conduit 186 or may be a conduit removed from fume conduit 186. Shield gases may be supplied to shield gas conduit 188 from a shield gas source 190. Shield gas conduit 188 may transport shield gases such as, for example, carbon dioxide or argon into shield gas chamber 182 of torch arm 150. Passage 176 may be mechanically coupled to torch arm 150 such that fume conduit 186 and shield gas conduit 188 may align with fume chamber 180 and shield gas chamber 182, respectively.

Vacuum source 178 may include a fan 192 and a valve 194. Vacuum source 178 may be connected to fume conduit 186 and may establish a flow, within fume conduit 186, of fumes from fume chamber 180 to vacuum source 178. Vacuum source 178 may produce an area of lower pressure within fume conduit 186 near vacuum source 178, causing air and fumes to move by suction flow from torch arm 150 toward vacuum source 178. Fan 192 may be any suitable fan known in the art for establishing flow in fume conduit 186 and may be driven by either a constant speed drive or a variable speed drive. Valve 194 may be any suitable valve for varying the flow of vacuum source 178 such as, for example, a butterfly valve or other variable restriction valve. Valve 194 may have a rotatable plate that may substantially allow flow when positioned parallel to flow, partially block flow when positioned at an angle to flow, and substantially block flow when positioned perpendicular to flow. As the rotatable plate moves from the perpendicular position to the parallel position, the flow through fume conduit 186 may increase. As the rotatable plate moves from the parallel position to the perpendicular position, the flow through fume conduit 186 may decrease. A valve actuator 196 may actuate the rotatable plate of valve 194, thereby varying flow through fume conduit 186.

Shield gas chamber 182 may be disposed within torch arm 150. Shield gas chamber 182 may be connected to shield gas conduit 188 and may receive shield gases from source 190 via shield gas conduit 188. Shield gas chamber 182 may have an outlet 198 through which shield gases may be released from torch arm 150 to a welding location 200. Outlet 198 may be co-located with weld tip 152 such that shield gas may form an envelope around weld wire 158, thereby preventing contamination of weld 160 by ambient air of an atmosphere of work area 175.

Fume chamber 180 may be disposed within torch arm 150. Fume chamber 180 may be located proximal to shield gas chamber 182. Fume chamber 180 may be coupled to fume conduit 186 and may transfer fumes to vacuum source 178 via fume conduit 186. Fumes may enter fume chamber 180 via a plurality of inlets 202 disposed on torch arm 150 in proximity to weld tip 152. Inlets 202 may be in proximity to weld tip 152 when disposed on a distal end of robotic welder 110 such as, for example, a midpoint of torch arm 150 or an opposite end of torch arm 150 as outlet 198, such that inlets 202 may fluidly communicate with air surrounding weld tip 152 and torch arm 150. Vacuum source 178 may thereby be coupled in proximity to weld tip 152 via inlets 202, fume chamber 180, and fume conduit 186. When vacuum source 178 is operating, a pressure within fume chamber 180 may be less than an atmospheric pressure of air surrounding weld tip 152. Fumes may be drawn via suction, created by the pressure imbalance, from air surrounding weld tip 152 into fume chamber 180 via inlets 202. Welding fumes produced by robotic welder 110 may thereby be extracted via vacuum source 178 and removed from work area 175.

Control system 130 may include a control 204, a program 206, and a sensor 208. Control 204 may power welding system 100 and may control robotic welder 110 and/or fume extraction system 120. Program 206 may be a program executed by control 204 for controlling robotic welder 110 and/or fume extraction system 120. Sensor 208 may provide input to control 204 for adjusting fume extraction system 120.

Control 204 may include a programmable logic controller known in the art for automating machine processes. Control 204 may include a positive power line 210 that may be electrically connected to power block 138 and a sensor 212 that may be connected to weld wire feeder 156. Control system 130 may also include a negative power line 214 and a sensor 216 that may be electrically connected to support member 164. Power lines 210 and 214 may serve to create an electrical circuit to power robotic welder 110, and sensors 212 and 216 may provide voltage information to control 204. Control 204 may control robotic welder 110 and/or vacuum source 178 according to program 206. If fan 192 is driven by a variable speed drive, a speed of fan 192 may be controlled by control 204 via an electrical line 218. Additionally or alternatively, control 204 may control valve actuator 196 via an electrical line 220 to actuate valve 194. Control 204 may thereby vary vacuum source 178, affecting an amount of flow through fume conduit 186. Control 204 may also control a flow of shield gas from source 190 via a power line 221 as a function of program 206, thereby controlling an amount of shield gas released by welding system 100.

Program 206 may be a set of predetermined instructions such as, for example, a computer program, to be read by control 204 and executed by robotic welder 110. An operator/programmer may pre-program program 206 for a welding procedure to be completed on work piece 162. The operator/programmer may use any suitable method known in the art to create program 206 such as, for example, using computer modeling and/or physically positioning robotic welder 110 through each step of the welding procedure and recording data such as voltage at each position. Program 206 may define input such as movements of robotic welder 110, locations on work piece 162 to be welded, amounts of electrical energy to be provided to robotic welder 110 by control 204, and intensity of welding arc 154. Program 206 may also include the level of fume extraction to be produced by vacuum source 178 at each stage in the welding procedure. Program 206 may provide instructions to control 204 for varying the flow level of vacuum source 178 such that substantially throughout the welding procedure vacuum source 178 provides enough flow to adequately remove welding fumes while not substantially removing beneficial shield gases. Therefore, control 204 may selectively vary vacuum source 178 in a preprogrammed manner as a function of the position of robotic welder 110 at each stage of the welding procedure. Program 206 may also provide instructions to control 204 for releasing an appropriate amount of shield gases from source 190 at each stage of the welding procedure. Control 204 may thereby maintain the shield gases proximate to weld 160 while extracting welding fumes produced by robotic welder 110 to improve the environment of work area 175 while maintaining weld quality.

Sensor 208 may provide input to control 204 for helping to maintain an appropriate level of flow by vacuum source 178. Sensor 208 may be disposed within fume conduit 186 and may thereby be substantially protected against welding effects such as heat. Sensor 208 may be configured to measure the level of flow through fume conduit 186 and may input flow data to control 204 via an electrical line 222. Control 204 may include an estimator map 224 for estimating a desired flow during the welding procedure as a function of program 206. Control 204 may compare the desired flow of estimator map 224 to the flow data supplied by sensor 208 to determine differences in value. Differences may be due to, for example, a changed filter condition of vacuum source 178 or a partial plugging of inlets 202 and/or fume conduit 186. Control 204 may vary the flow generated by vacuum source 178 and/or the amount of shield gases released by source 190 to account for the changed conditions. Therefore, control 204 may use input from sensor 208 to maintain flow within fume extraction system 120 as a function of program 206. Additionally or alternatively, sensor 208 may sense a warning condition requiring an alarm or other indicator to be signaled, or may sense a condition requiring the halting of the welding procedure.

INDUSTRIAL APPLICABILITY

Robotic welder 110 may form weld 160 via weld tip 152 of torch arm 150, thereby generating welding fumes. Fume extraction system 120 may operate to automatically remove welding fumes to improve an environmental condition of work area 175 while maintaining shield gases.

Control 204 may control robotic welder 110 to form weld 160 via welding arc 154. Control 204 may control an operation of vacuum source 178 as a function of program 206 to vary flow within fume conduit 186. Control 204 may control a drive speed of fan 192, via line 218, and/or control a position of valve 194, via line 220 and valve actuator 196, to vary vacuum source 178 and thereby control flow through fume extraction system 120. The welding fumes may be drawn into vacuum source 178, via fume conduit 186, and filtered and/or released by vacuum source 178 away from work area 175.

Control 204 may vary the flow level of vacuum source 178 substantially throughout the welding procedure as a function of program 206. Control 204 may also vary the amount of shield gases released from source 190 at each stage of the welding procedure as a function of program 206. Therefore, control 204 may substantially continually vary the flow level of vacuum source 178 and the amount of shield gases released from source 190 to remove an appropriate amount of exhaust gas while maintaining a sufficient envelope of beneficial shield gases to protect weld 160.

Control 204 may receive flow data from sensor 208 via line 222 and may use the data to adjust the flow of vacuum source 178. If there is a change in flow due to, for example, a change in the condition of the filter of vacuum source 178 or a partial plugging of inlets 202 and/or fume conduit 186, sensor 208 may deliver a signal indicative of flow rate to control 204. Control 204 may compare the flow rate from sensor 208 to estimator map 224 to adjust vacuum source 178 to account for the changed condition. Control 204 may make the appropriate change to the flow level of vacuum source 178 to maintain the appropriate level of flow as a function of program 206.

Welding system 100 may improve environmental conditions in work area 175 while maintaining shield gases to enhance the quality of weld 160. Control system 130 may automatically vary a flow rate of fume extraction system 120 to maintain an appropriate amount of fume extraction to avoid the removal of beneficial shield gases while still providing for the adequate removal of welding fumes.

It will be apparent to those skilled in the art that various modifications and variations can be made to the disclosed welding system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A fume extraction system for use with a robotic welder, comprising:
   a robotic welder having a weld tip;
   a variable vacuum source coupled in proximity to the weld tip; and
   a controller including instructions relating a flow level of the vacuum source to a plurality of positions, the controller being configured to:
      retrieve the instructions relating the flow level of the vacuum source to the plurality of positions; and
      vary the vacuum source based on the instructions.

2. The fume extraction system of claim 1, wherein the vacuum source includes one of a variable speed fan or a constant speed fan and a variable restriction valve.

3. The fume extraction system of claim 2, wherein the variable restriction valve is a butterfly valve.

4. The fume extraction system of claim 1, further including a sensor connected to the controller and configured to measure a flow rate of the vacuum source.

5. The fume extraction system of claim 1, further including a torch arm having a distal end including the weld tip; and
   a first chamber disposed in the torch arm of the robotic welder, the first chamber connected to the vacuum source via a conduit.

6. The fume extraction system of claim 5, further including a second chamber connected to a shield gas source and having an outlet located adjacent the weld tip.

7. The fume extraction system of claim 6, wherein the first chamber is located proximal the second chamber.

8. The fume extraction system of claim 1, wherein the controller is further configured to adjust a flow rate of the vacuum source based on a sensed condition of the system.

\* \* \* \* \*